United States Patent
Bzorgi

[19]

[11] Patent Number: 5,989,414
[45] Date of Patent: Nov. 23, 1999

[54] SELF-ADJUSTING SURFACE FLUID EXTRACTION NOZZLE

[75] Inventor: Fariborz M. Bzorgi, Knoxville, Tenn.

[73] Assignee: Bechtel Group, Inc., San Francisco, Calif.

[21] Appl. No.: 09/006,106

[22] Filed: Jan. 13, 1998

Related U.S. Application Data

[60] Provisional application No. 60/035,894, Jan. 24, 1997, and provisional application No. 60/063,470, Oct. 10, 1997.

[51] Int. Cl.[6] .................................................. B01D 29/11
[52] U.S. Cl. ....................... 210/121; 210/170; 210/242.1; 210/242.3
[58] Field of Search ..................................... 210/908, 923, 210/242.1, 242.3, 170, 121, 776, 747, 123; 137/429, 430, 432, 433; 261/70

[56] References Cited

U.S. PATENT DOCUMENTS

| | | |
|---|---|---|
| 3,962,093 | 6/1976 | Gibson . |
| 4,133,765 | 1/1979 | Stupica . |
| 4,663,037 | 5/1987 | Breslin . |
| 4,790,936 | 12/1988 | Renfrow . |
| 4,998,585 | 3/1991 | Newcomer et al. . |
| 5,106,494 | 4/1992 | Norcross . |
| 5,207,897 | 5/1993 | Baird et al. . |
| 5,235,999 | 8/1993 | Lindquist et al. . |
| 5,474,685 | 12/1995 | Breslin . |

FOREIGN PATENT DOCUMENTS

| | | |
|---|---|---|
| 40 07 599 A1 | 9/1991 | Germany . |
| 60-137486 | 7/1985 | Japan . |
| 1657624 A1 | 6/1991 | Russian Federation . |
| 1 274 387 | 5/1972 | United Kingdom . |

*Primary Examiner*—W. L. Walker
*Assistant Examiner*—Michael Fleming
*Attorney, Agent, or Firm*—Townsend and Townsend and Crew LLP

[57] ABSTRACT

A self-adjusting extraction nozzle for extracting a surface disposed over a base fluid includes a suction tube having at least one slot extending therethrough. A nozzle channel extends outwardly from the at least one slot. The nozzle channel is slidably coupled to the exterior of the suction tube and to a float to support the nozzle channel at a level of the surface fluid.

27 Claims, 7 Drawing Sheets

SELF-ADJUSTING SURFACE FLUID EXTRACTION NOZZLE

This application claims priority from Provisional Application Ser. No. 60/035,894 filed Jan. 24, 1997, and Provisional Application Ser. No. 60/063,470 filed Oct. 10, 1997, the disclosures of which are incorporated herein by reference.

BACKGROUND OF THE INVENTION

This invention relates to the removal or recovery of oil, fuel layer, or other hydrocarbons or pollutants from the surface of water or other fluids of higher density than the material on the surface.

Many groundwater remediation techniques use an slurp tube to remove the free product on the surface of water of, for example, a well. A typical slurp tube has a pipe with an open end nozzle at the bottom end which can be lowered into a well to extract the free product. The slurp tube must be manually adjusted to lift and lower the pipe to maintain the level of the open end nozzle approximately at the top ¼" of the water just below the free product. The bottom end design of the nozzle results in a large amount of water entering the nozzle.

Some have employed a flexible line that is towed with boats along the surface of the water to extract oil or other free product on the surface of the water, such as that disclosed in U.S. Pat. No. 4,133,765 to Stupica. The flexible tube may cause a clog inside when it is bent, and must be made of a soft material that may be damaged by repeated bending.

Other techniques employ the principle of neutral buoyancy in which an apparatus has a flexible tube supported by a float, such as those shown in U.S. Pat. Nos. 4,663,037 and 5,474,685 to Breslin. The tube has an upper inlet disposed near the oil layer. A portion of the flexible tube moves with the float while the remaining portion of the flexible tube is fixed. The apparatus operates as a perfectly balanced scale. The slightest load change, which may be caused by a shift in weight of the tube as it moves with the float, will change the balance. As a result, the apparatus will either float on the surface of the oil or sink due to the loss of balance.

SUMMARY OF THE INVENTION

The present invention provides a self-adjusting nozzle that is simple in structure and provides stable and smooth operation for the extraction of a light fluid disposed above a heavy fluid that is higher in density than the light fluid.

A feature of the present invention is to provide a self-adjusting nozzle having a self-adjusting float.

Another feature of the invention is to provide a self-adjusting nozzle that does not require flexible tubes or gaskets.

Yet another feature of the invention is to minimize the need for maintenance for the self-adjusting nozzle.

Broadly, the self-adjusting nozzle includes a suction tube that is coupled to a surface fluid at a level just above the interface between the surface fluid and a base fluid. The coupling between the suction tube and the surface fluid is facilitated by a buoyant member.

In accordance with an aspect of the present invention, a self-adjusting surface fluid extraction nozzle for extracting a surface fluid disposed above a base fluid comprises a suction tube having an interior and an exterior. The suction tube includes at least one slot extending therethrough. At least one nozzle channel extends outwardly from the at least one slot and is slidably coupled to the exterior of the suction tube to move in a direction generally along the at least one slot. A float is coupled to the at least one nozzle channel to support the at least one nozzle channel at a level of the surface fluid.

In accordance with another aspect of the invention, a self-adjusting nozzle for extracting a light fluid from the surface of a heavy fluid having a density higher than the density of the light fluid comprises a column having a column wall with a plurality of slots extending generally longitudinally therethrough. A collar is slidably disposed longitudinally outside the column wall and includes a plurality of collar apertures for coupling at least some of the plurality of slots with the light fluid. The self-adjusting nozzle further comprises mechanism, coupled to the collar, for adjusting the position of the collar relative to the column to maintain coupling of the plurality of collar apertures between the plurality of slots and the light fluid.

Another aspect of this invention is a self-adjusting surface fluid extraction nozzle for extracting a surface fluid from a base fluid. The extraction nozzle comprises a suction tube having a tube wall with at least one slot extending therethrough generally along the length of the suction tube. A float is slidably coupled to the suction tube. The float has a density and weight to float relative to an interface between the surface fluid and the base fluid. The extraction nozzle further comprises mechanism, coupled to the float, for communicating between the at least one slot and the light fluid.

BRIEF DESCRIPTION OF THE DRAWINGS

The preferred embodiments of this invention, illustrating all their features, will now be discussed in detail. These embodiments depict the novel and nonobvious self-adjusting nozzle of this invention shown in the accompanying drawings, which are included for illustrative purposes only. These drawings include the following figures, with like numerals indicating like parts.

DESCRIPTION OF THE SPECIFIC EMBODIMENTS

Figure 1:
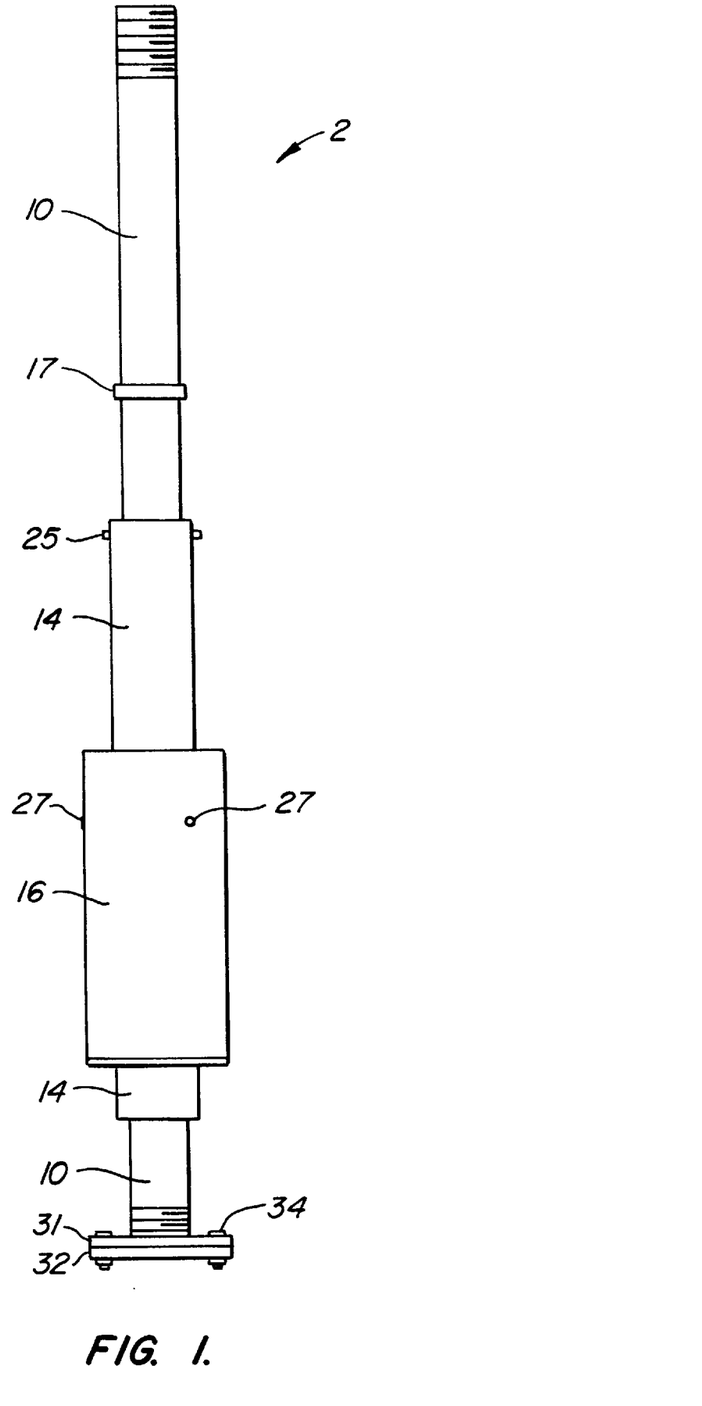
FIG. 1 is an elevational view of a self-adjusting extraction nozzle illustrating a first embodiment of the present invention.

FIG. 1 shows a first embodiment of a self-adjusting extraction nozzle 2, which includes a suction column 10 housed partially and slidably within a collar 14. A float 16 is disposed adjacent and connected to the exterior of the collar 14, e.g., by welding, adhesives, or the like.

Figure 2:
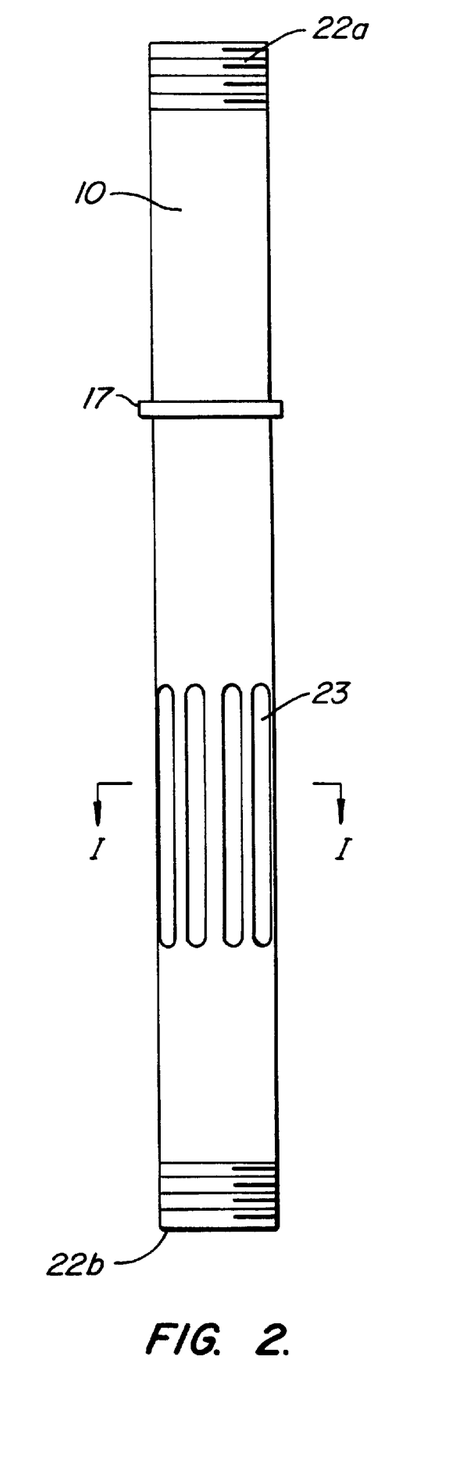
FIG. 2 is an elevational view of a suction column of the self-adjusting extraction nozzle of FIG. 1.
Figure 3:
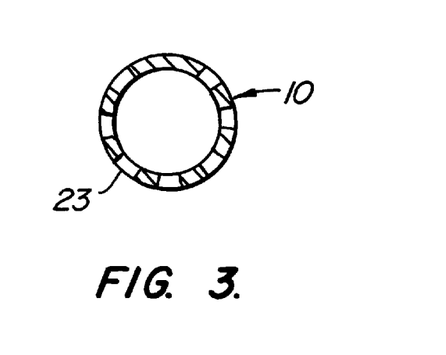
FIG. 3 is a cross-sectional view of the suction column of FIG. 2 along I—I.

As more clearly seen in FIGS. 2 and 3, the suction column 10 is a generally circular cylindrical shell, and includes an upper stop 17 having a size larger than the cylindrical column 10. The suction column 10 has upper threads 22a at the upper end and lower threads 22b at the lower end. Located between the upper stop 17 and the lower threads 22b are a plurality of through slots 23 extending generally longitudinally and parallel to the axis of the suction column 10. In FIG. 3, the cross-section taken along A—A is divided into eight equal and evenly distributed sectors, with seven slots 23 occupying seven of the eight sectors. Although eight slots may be provided, the use of seven slots 23 provides improved structural stability and strength for the column 10.

Figure 4:
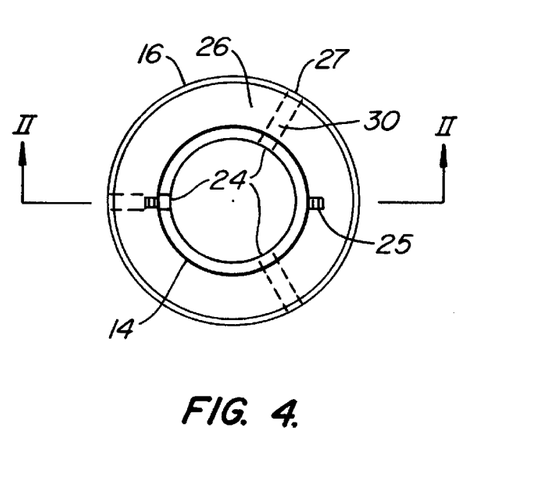
FIG. 4 is a top plan view of a collar and a float of the self-adjusting extraction nozzle of FIG. 1.
Figure 5:
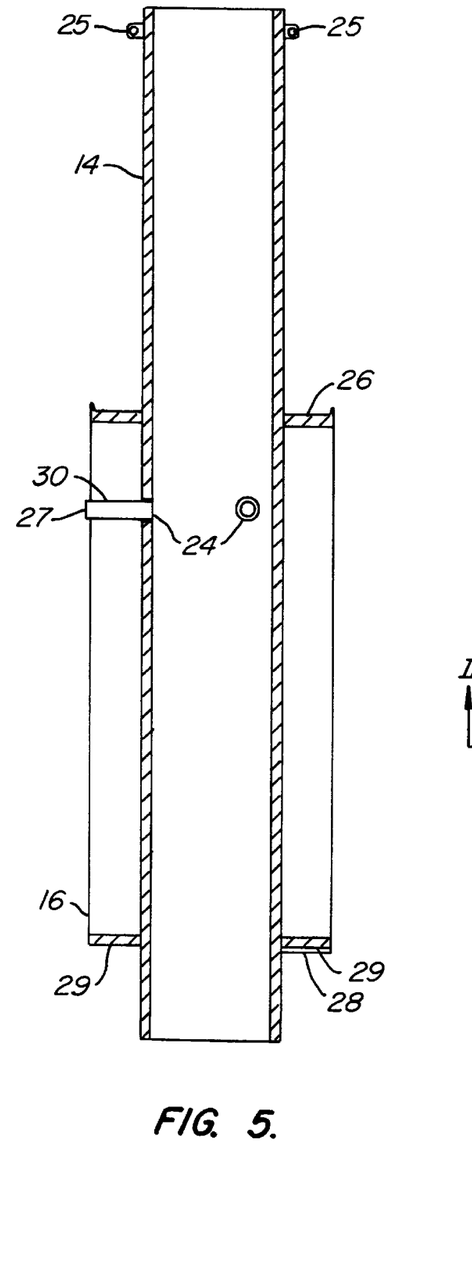
FIG. 5 is a cross-sectional view of the collar and float of FIG. 4 along II—II.

As shown in FIGS. 4 and 5, the collar 14 is also a generally circular cylindrical shell, and includes a plurality or ring of collar apertures 24 lying in a plane generally perpendicular to its axis. The illustrated embodiment has three such collar apertures 24 evenly spaced from each other 120° apart. The inner size of the collar 14 is slightly larger than the outer size of the suction column 10 for slidably receiving the suction column 10. The collar 14 may include a pair of oppositely disposed lifting hook eyes 25 near its upper end. The lifting hook eyes 25 have small holes for receiving lifting hooks (not shown).

The schematically illustrated float 16 is a generally circular cylindrical shell having an upper circular end plate 26 and a lower circular end plate 28 that are generally annular and connected to the exterior of the collar 14. The interior of the float 16 and the exterior of the collar 14 form an enclosure inside the float 16 for trapping air. The float 16 includes a plurality of float apertures 27 lying in the plane defined by the collar apertures 24 being generally perpendicular to its axis. The float apertures 27 correspond in position to the collar apertures 24.

FIGS. 4 and 5 show three such float apertures 27 spaced from each other by 120°, but more or fewer float apertures 27 may be used. The float apertures 27 may be generally the same in size to the collar apertures 24 as shown. The upper end plate 26 is a solid plate, while the lower end plate 28 is a perforated plate with a plurality of perforations 29. The perforations 29 allow fluid to enter into the enclosure therethrough to compress the air trapped therein, as discussed in more detail below.

A plurality of nozzle channels 30 extend between the collar apertures 24 and the float apertures 27 and are disposed in the plane defined by the collar apertures 24 and the float apertures 27. This plane is generally perpendicular to the axes of the collar 14 and column 10. In other embodiments, the plane may be slanted with respect to the axis of the column 10 by as much as about +/−45°.

FIGS. 4 and 5 show three nozzle channels 30 that provide communication between the interior of the collar 14 and the exterior of the float 16. The suction column 10, collar 14, float 16, and nozzle 30 are advantageously made from generally rigid, light-weight materials such as aluminum, copper, PVC, or the like. The materials selected are desirably resistant to corrosion that may be caused by contact with fluids such as sea water and hydrocarbons or other contaminants.

Referring to the assembled nozzle 2 of FIG. 1, the suction column 10 is inserted through the slightly larger interior of the collar 14 from the lower end. The lower threads 22b of the suction column 10 are threaded onto a flange 31 and a blind flange 32 with sets of connectors 34 such as bolts, nuts, lock washers, and the like. The flange 31 and blind flange 32 are generally circular, advantageously having diameters slightly larger than the outer diameter of the float 16. This configuration prevents contact of the float 16 with the surrounding, such as a well casing during operation. Therefore, the flange 31 and blind flange 32 act as a guide for the nozzle 2. In addition, the flanges 31, 32 serve as a clean out cover that can be removed when needed to clean the suction column 10. The three collar apertures 24 are aligned with three of the longitudinal slots 23 of the suction column 10. This results in an alignment of the float apertures 27, nozzle channels 30, collar apertures 24, and longitudinal slots 23 to form communication between the interior of the column 10 and the exterior of the float 16 (where the surface fluid is disposed). The larger number of slots 23 allow the communication between the interior of the column 10 and the exterior of the float 16 to be maintain when the collar 14 rotates relative to the suction column 10. Alternatively, a restrictive guide (not shown) may be provided to restrict the relative movement of the collar 14 and the column 10 to longitudinal displacements without rotation. In that case, the number of slots 23 would be equal to the number of collar apertures 24. Such a guide may, however, generate friction against smooth movement of the collar 14.

Figure 6:
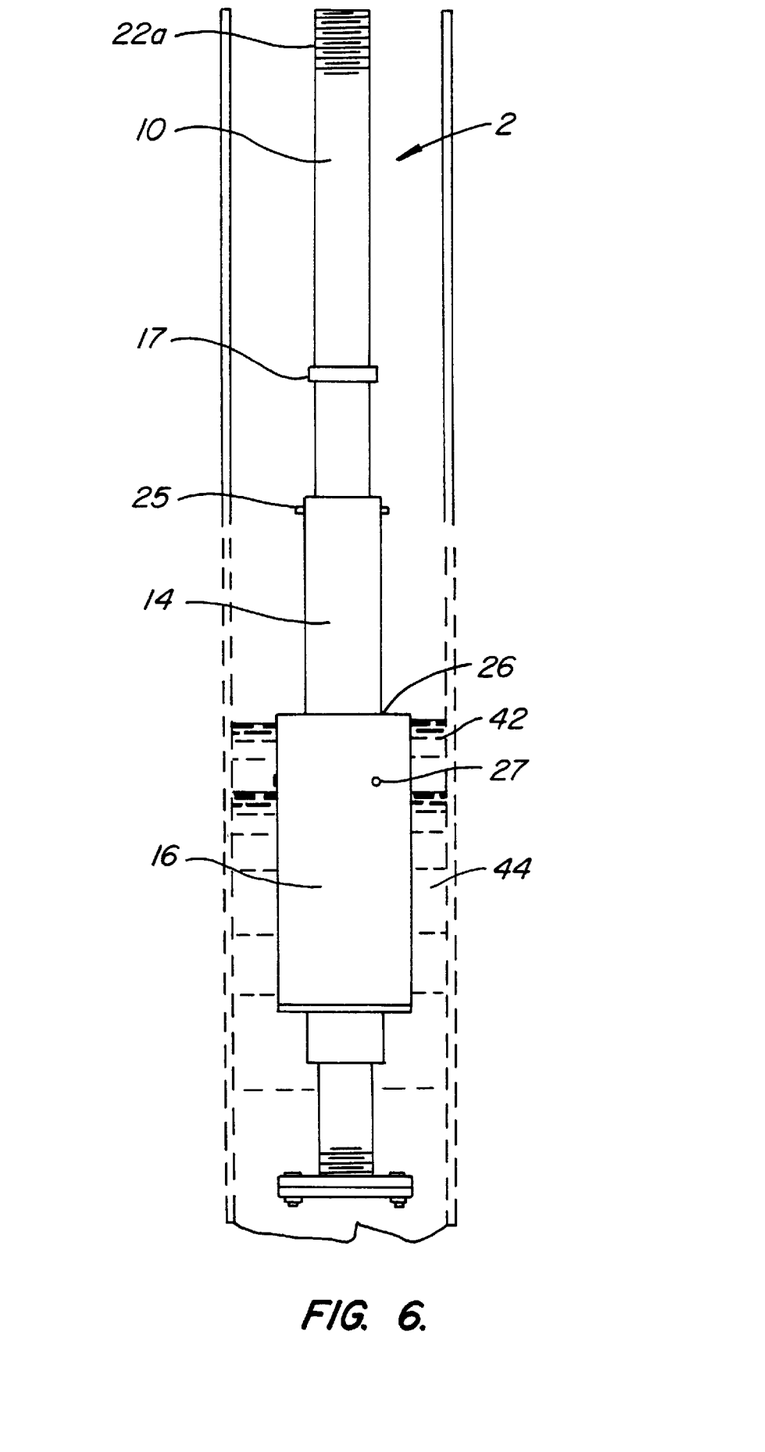
FIG. 6 is an elevational view of the self-adjusting extraction nozzle of FIG. 1 illustrating the position of the nozzle for operation in a well.

FIG. 6 illustrates the self-adjusting nozzle 2 lowered into a well having a light surface fluid 42 floating on top of a base fluid or heavy fluid 44. For instance, the heavy fluid 44 may be water and the light fluid 42 may be an LNAPL (light non-aqueous phase liquid). The nozzle 2 is generally disposed vertically so that the axes of the suction column 10 and collar 14 are generally vertical and the nozzle channels 30 are generally disposed horizontally. The column 10 is substantially fixed with respect to the fluids. The selected position of the column 10 is governed by the relative position of the slots 23 of the column 10 and the level of the interface between the two fluids.

The surface fluid 42 is extracted at a level slightly above the interface, e.g., about ¼ inch above the interface. The extraction level must be disposed within the length or vertical range of the slots 23 to extract the light fluid 42 through the float apertures 27, nozzle channels 30, collar apertures 24, and the slots 23 into the interior of the column 10. The extraction nozzle 2 is disposed relative to the fluids 42, 44 accordingly. The light fluid 42 extracted into the column 10 is removed by suction generated by a pump, vacuum blower, or similar device (not shown) through the upper end of the column 10. The upper threads 22a are provided for attachment to a suction line connected to a suction source (not shown). The nozzle 2 operates independently without the need for adjustment. The adjustment envelope is directly proportional to the length of the slots 23. If the interface level changes because of the change in the heavy fluid 44, the nozzle 2 will still operate properly provided that the interface level does not move beyond the length or vertical span of the slots 23 of the suction column 10. If the interface level moves beyond the length of the slots 23, the nozzle 2 will need to be adjusted by changing the vertical position of the suction column 10 up or down so that the interface level is disposed within the length or vertical range of the slots 23. The length of the slots 23 may be selected based on the potential vertical movement of the interface level for the particular application.

The movement of the collar 14 relative to the generally fixed column 10 is generated by the float 16. The movement of the float 16 is governed by the properties of the fluids, and is generally proportional to the specific gravity of the surrounding fluids. The float 16 floats as a result of the trapped air inside the float 16. The float 16 self-adjusts the position of the collar 14 and the level of the nozzle channels 30 as the interface level changes due to extraction of the light fluid 42 or changes in volume of the light fluid 42 or heavy fluid 44. The travel of the collar 14 is limited by the upper stop 17 at the top and the flange 31 at the bottom.

For a given application, the initial positions of the collar 14 and float 16 are adjusted by puncturing or drilling hole(s) along the side of the float 16. A portion of the trapped air escapes through the hole(s) and the level of the heavy fluid 44 within the float 16 rises to the level of the punctured hole(s). This causes the float 16 and collar 14 to drop in position with respect to the suction column 10. This procedure can be repeated until the desired preset initial positions of the collar 14 and float 16 are achieved.

The nozzle 2 self-adjusts according to the change in the levels of the fluids so that the nozzle openings at the float apertures 27 are kept generally at a preset level in the light fluid near the interface between the light fluid 42 and the heavy fluid 44. The generally horizontal or side suction from the float apertures 27 reduces or eliminates splashing or gulping, and minimizes extraction of the heavy fluid. The components of the nozzle 2 are light-weight and easy to assemble. The column 10 is substantially rigid. The relative motion between the collar 14 and suction column 10 is linear, smooth, and stable. The nozzle 2 is simple in structure and reliable, and does not require substantial maintenance.

The lifting hook eyes 25 of the collar 14 are not necessary, but may be useful for connecting through a hook to a rope that extend to a valve box (not shown). In that case, the rope may be tugged regularly, e.g., once a month, to make sure that the collar 14 is floating.

The self-adjusting nozzle 2 may have different dimensions and may scale up or down depending on the application. In one example, the suction column 10 has an outer diameter of about 1.31" and a thickness of about 0.13". The slots 23 of the column 10 have lengths of about 12". The collar 14 has an inner diameter of about 1.38" and a thickness of about 0.14". The float 16 has an outer diameter of about 4.51" and a length of about 16". The float apertures 27 have diameters of about 0.251" and lengths of about 1.51".

It is noted that other embodiments of the self-adjusting nozzle 2 may comprise a suction tube (not shown) that need not be straight and vertically disposed as the suction column 10 of FIGS. 1 and 6. For instance, a suction column disposed at an angle or a slightly curved suction tube may be used (not shown). In those cases, the other components of the nozzle 2 may likewise be modified to achieve similar extraction results.

Figure 7:
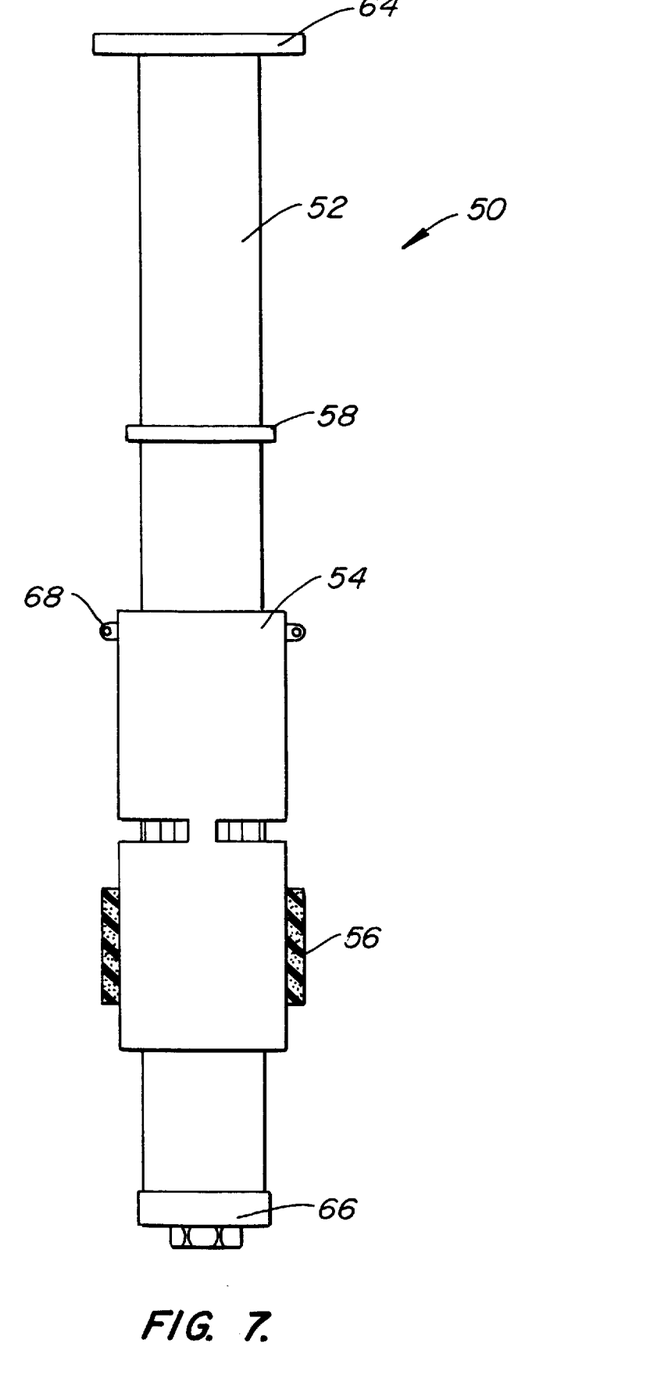
FIG. 7 is an elevational view of a second self-adjusting extraction nozzle illustrating a second embodiment of the present invention.
Figure 8:
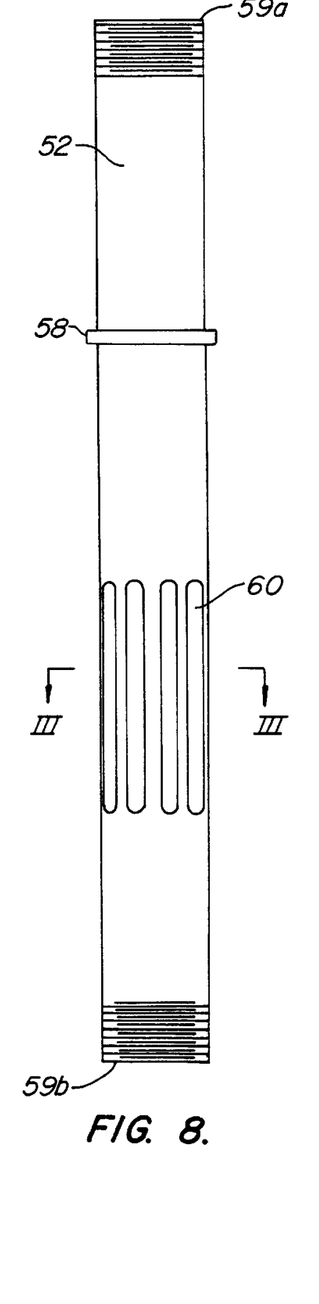
FIG. 8 is an elevational view of a suction column of the self-adjusting extraction nozzle of FIG. 7.
Figure 9:
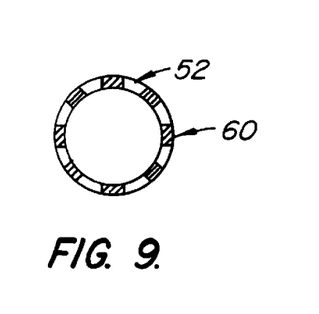
FIG. 9 is a cross-sectional view of the suction column of FIG. 8 along III—III.

In the second embodiment shown in FIG. 7, the self-adjusting surface fluid extraction nozzle 50 comprises a suction column 52, a collar 54, and a float 56. As best seen in FIGS. 8 and 9, the suction column 52 is similar to the suction column 10 of FIGS. 1–3. The suction column 52 has an upper stop 58, upper threads 59a, lower threads 59b, and a plurality of through slots 60 disposed between the upper and lower threads 59a, 59b. FIGS. 8 and 9 show eight slots 60 evenly distributed, but the suction column 52 may have seven slots as configured in FIG. 3 of the first embodiment. FIG. 7 shows an upper plate 64 threaded onto the upper threads 59a and a lower plate 66 threaded onto the lower threads 59b of the suction column 52.

Figure 10:
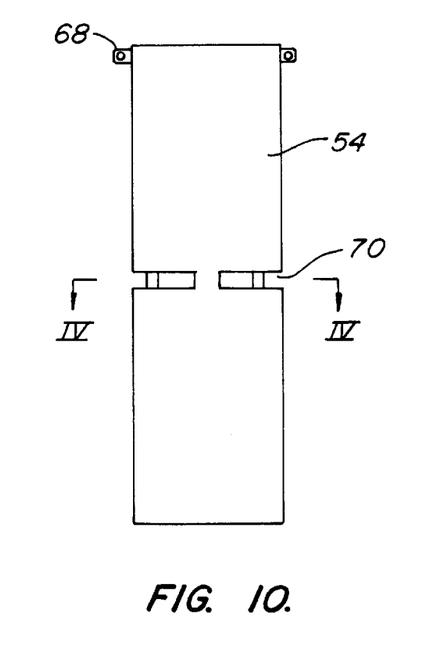
FIG. 10 is an elevational view of a collar of the self-adjusting extraction nozzle of FIG. 7.
Figure 11:
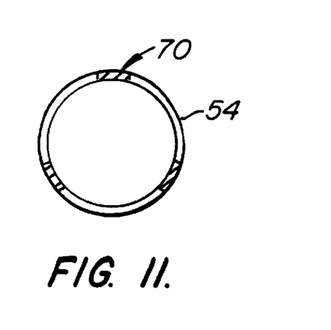
FIG. 11 is a cross-sectional view of the collar of FIG. 10 along IV—IV.

The collar 54 is a generally circular cylindrical tube-like member as shown in FIGS. 7 and 10–11. The collar 54 includes lifting hook eyes 68 that are similar to those in FIG. 5 and serve the same function. The collar 54 comprises a plurality of collar apertures 70 extending through the wall of the collar 54. FIGS. 10 and 11 show three collar apertures 70 symmetrically spaced by 120° and disposed in a middle region of the collar 54. Each collar aperture 70 covers about 100° of the circumference. In other embodiments, the number, sizes, arrangement, and position of the collar apertures 70 may be different.

Figure 12:
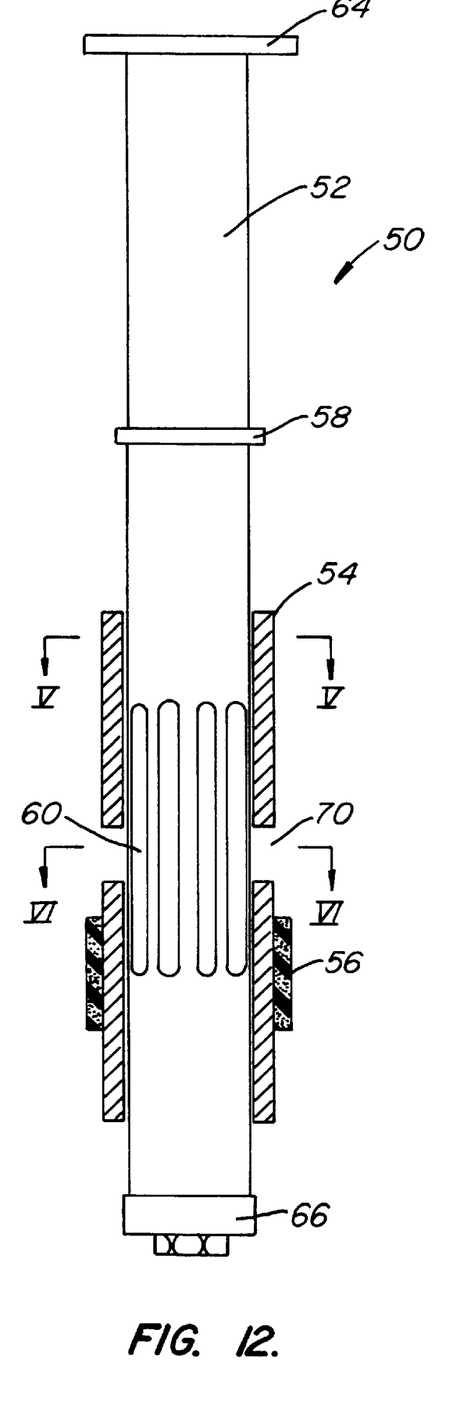
FIG. 12 is a partial cross-sectional view of the self-adjusting extraction nozzle of FIG. 7 illustrating the configuration of a float with the collar and suction column.
Figure 13:
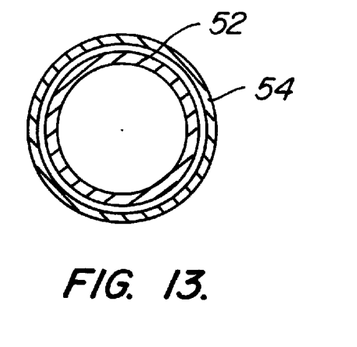
FIG. 13 is a cross-sectional view of the self-adjusting extraction nozzle of FIG. 12 along V—V illustrating the coupling between the housing of the collar and the suction column.
Figure 14:
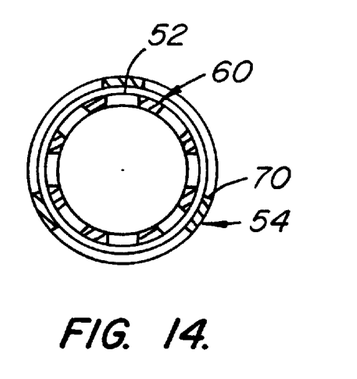
FIG. 14 is a cross-sectional view of the self-adjusting extraction nozzle of FIG. 12 along VI—VI illustrating the coupling between the apertures of the collar and the suction column.

As best seen in FIGS. 12 and 13, the inner surface of the wall of the collar 54 is slightly larger in size than the outer surface of the suction column 52 for slidably receiving the column 52. FIG. 14 shows the relative positions of the slots 60 of the column 52 and the collar apertures 70. At least one of the collar apertures 70 must overlap one of the slots 60 to communicate the interior of the suction column 52 with the outside of the collar 54. In this embodiment, the collar apertures 70 are larger in size than the slots 60, while the number of slots 60 is larger than the number of collar apertures 70. Each collar aperture 70 overlaps two or more of the eight slots 60. As in the first embodiment, the larger number of slots 60 allow the communication between the interior of the column 52 and the exterior of the collar 54 to be maintained when the collar 54 rotates relative to the suction column 52. Alternatively, a restrictive guide (not shown) may be provided to prevent relative rotation between the collar 54 and the column 52.

FIGS. 12 illustrates the cross-section of the float 56 shown in FIG. 7. The float 56 is a ring-like member connected to the exterior surface of the collar 54. The float 56 may be attached to the collar 54 by adhesives, fasteners, or the like. The float 56 may have other shapes and sizes, but is advantageously compact and easy to handle.

The operation of the self-adjusting nozzle 50 is similar to that of the first embodiment 2. The extraction of the surface fluid takes place at a level slightly above, e.g., about ¼ inch above, the interface of the light surface fluid and the heavy base fluid. The collar apertures 70 are positioned at this extraction level to form communication between the surface fluid and the slots 60 of the suction tube 52 for extraction of the surface fluid through the tube 52. The float 56 supports the collar 54 to position the collar apertures 70 at this extraction level. When the level of the base fluid changes, the float 56 self-adjusts the position of the collar 54 and the level of the collar apertures 70 to maintain the fluid communication between the surface fluid and the slots 60 of the column 52. The density and size of the float 56 are chosen to achieve the proper self-adjustment of the collar 54 relative to the suction tube 52. The generally horizontal or side suction from the collar apertures 70 and the slots 60 reduces or eliminates splashing or gulping, and minimizes extraction of the base fluid. The second embodiment of the self-adjusting nozzle 50 is simple in structure and operates reliably and smoothly.

As discussed above in connection with the first embodiment of the self-adjusting nozzle 2, the configuration of the components may be changed to produce similar extraction results. The materials for the suction column 52 and the collar 54 of the nozzle 50 are similar to those in the column 2 of FIG. 1. The float 56 may be made of a variety of floating materials, such as buoyant foam (including Polyurethane) and the like, selected to have densities that support the collar apertures 70 of the collar 54 at a level slightly above the interface between the surface fluid and the base fluid to extract the light surface fluid. The dimensions of like components of an example of the self-adjusting nozzle 50 of FIG. 7 are similar to those of the nozzle 2 in FIG. 1. In the example, the height of the collar apertures 70 is about 0.5".

The above-described arrangements of apparatus and methods are merely illustrative of applications of the principles of this invention and many other embodiments and modifications may be made without departing from the spirit and scope of the invention as defined in the claims.

What is claimed is:

1. A self-adjusting surface fluid extraction nozzle for extracting a surface fluid disposed above a base fluid, the nozzle comprising:
    a suction tube including a longitudinal axis and having an interior and an exterior, at least one elongated slot extending through the suction tube;
    at least one nozzle channel radially extending outwardly from and coupled with a portion of the at least one elongated slot, the at least one nozzle channel being sidably coupled to the exterior of the suction tube at an angle of between about ±45° from a plane perpendicular to the longitudinal axis of the suction tube to move relative to the at least one elongated slot in a direction generally along the at least one elongated slot to be coupled with another portion of the at least one elongated slot; and
    a float coupled with the at least one nozzle channel to support the at least one nozzle channel at a level of the surface fluid.

2. The self-adjusting surface fluid extraction nozzle of claim 1, wherein the at least one nozzle channel extends through a portion of the float.

3. The self-adjusting surface fluid extraction nozzle of claim 1, wherein the float comprises an upper annular plate disposed above the at least one nozzle channel, a lower perforated annular plate disposed below the at least one nozzle channel, and a float wall connected between the upper annular plate and the lower perforated annular plate.

4. The self-adjusting surface fluid extraction nozzle of claim 3, wherein the float wall comprises at least one float aperture, the at least one nozzle channel is coupled to the at least one float aperture.

5. The self-adjusting surface fluid extraction nozzle of claim 1, wherein the float is disposed adjacent to the exterior of the suction tube and comprises a buoyant material having sufficient buoyancy to support the at least one nozzle channel at the level of the surface fluid.

6. The self-adjusting surface fluid extraction nozzle of claim 1, wherein the suction tube and the at least one nozzle channel are substantially rigid.

7. The self-adjusting surface fluid extraction nozzle of claim 1, wherein the suction tube comprises a plurality of the slots extending therethrough and being substantially evenly distributed around a circumference of the suction tube.

8. The self-adjusting surface fluid extraction nozzle of claim 1, wherein the suction tube comprises a plurality of the slots extending therethrough and the suction tube is divided into a plurality of substantially equal sectors around a circumference of the suction tube, the plurality of slots being disposed in the plurality of sectors and the number of the slots being at least one less than the number of the sectors.

9. The self-adjusting surface fluid extraction nozzle of claim 1, wherein the at least one nozzle channel is disposed generally horizontally.

10. A self-adjusting nozzle for extracting a light fluid from the surface of a heavy fluid having a density higher than the density of the light fluid, the nozzle comprising:
    a column including a longitudinal axis and having a column wall with a plurality of elongated slots extending generally longitudinally therethrough;
    a collar disposed outside of the column wall and including a plurality of collar apertures and a plurality of nozzle channels extending radially from the column wall for coupling at least some of the plurality of elongated slots to at least some of the plurality of collar apertures to communicate with the light fluid at a portion of each of the at least some of the plurality of elongated slots, the plurality of nozzle channels being disposed at an angle of between about ±45° from a plane perpendicular to the longitudinal axis of the column, the collar having an interior being slidably coupled longitudinally with the column to change the coupling between the plurality of collar apertures and the elongated slots to different portions of each of at least some of the plurality of elongated slots; and
    means, coupled with the collar, for automatically adjusting the position of the collar relative to the column to maintain coupling of the plurality of collar apertures between at least some of the plurality of elongated slots and the light fluid when the collar slides relative to the column.

11. The self-adjusting nozzle of claim 10, wherein the collar includes an exterior and the means comprises a buoyant member coupled to the exterior of the collar.

12. The self-adjusting nozzle of claim 11, wherein the buoyant member is disposed below the plurality of collar apertures.

13. The self-adjusting nozzle of claim 10, wherein the means comprises a floating fluid having a density substantially lower than the densities of the light fluid and heavy fluid.

14. The self-adjusting nozzle of claim 13, wherein the floating fluid is air.

15. The self-adjusting nozzle of claim 13, wherein the means comprises a housing having a lower perforated portion and a portion disposed above and spaced from the lower perforated portion for storing the floating fluid.

16. The self-adjusting nozzle of claim 15, wherein the amount of floating fluid in the housing is adjusted by making holes through a wall of the housing.

17. The self-adjusting nozzle of claim 16, wherein the amount of floating fluid in the housing is adjusted to position the coupling between the collar apertures and the light fluid at a level slightly above an interface formed between the light fluid and the heavy fluid.

18. The self-adjusting nozzle of claim 17, wherein the adjusted level is about ¼ inch above the interface.

19. The self-adjusting nozzle of claim 10, wherein the column includes an upper stop larger in cross-section than the interior of the collar.

20. The self-adjusting nozzle of claim 10, wherein the column and collar are generally cylindrical and coaxial.

21. The self-adjusting nozzle of claim 10, wherein the interior of the collar is slightly spaced from an external surface of the column.

22. The self-adjusting nozzle of claim 10, wherein the means comprises a plurality of nozzle channels which couple the plurality of collar apertures with the light fluid.

23. The self-adjusting nozzle of claim 10, wherein the collar apertures are generally evenly spaced and the slots are generally evenly spaced.

24. A self-adjusting surce fluid extraction nozzle for extracting a surface fluid from a base fluid, the nozzle comprising:

a suction tube including a longitudinal axis and having a tube wall with at least one elongated slot extending therethrough generally along the length of the suction tube;

a float slidably coupled with the suction tube, the float having a density and weight to float relative to an interface between the surface fluid and the base fluid; and at least one nozzle channel radially extending outwardly from and coupled with a portion of the at least one elongated slot, the at least one nozzle channel being slidably coupled to the suction tube at an angle of between about ±45° from a plane perpendicular to the longitudinal axis of the suction tube for communicating between a portion of the at least one elongated slot and the surface fluid; and means, coupled with the float, for automatically adjusting the position of the float relative to the suction tube to maintain communication between the at least one elongated slot and the surface fluid at different portions of the at least one elongated slot when the float slides relative to the suction tube.

25. The self-adjusting surface fluid extraction nozzle of claim 24, wherein the means comprises a collar disposed outside of the suction tube and having at least one collar aperture communicating between the at least one slot and the surface fluid.

26. The self-adjusting surface fluid extraction nozzle of claim 24, wherein the at least one nozzle channel extends generally horizontally through a portion of the float.

27. The self-adjusting surface fluid extraction nozzle of claim 24, wherein the suction tube is substantially rigid.

* * * * *